US012444864B2

(12) United States Patent
Jeon et al.

(10) Patent No.: US 12,444,864 B2
(45) Date of Patent: Oct. 14, 2025

(54) CONNECTOR HAVING NARROW SURFACE-MOUNT CONTACT PITCH

(71) Applicant: Apple Inc., Cupertino, CA (US)

(72) Inventors: James M. Jeon, Mountain House, CA (US); Mahmoud R. Amini, Sunnyvale, CA (US); Marc Soriano Baliarda, Irvine, CA (US); Tianrun Jiang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 484 days.

(21) Appl. No.: 17/951,699

(22) Filed: Sep. 23, 2022

(65) Prior Publication Data

US 2024/0106137 A1 Mar. 28, 2024

(51) Int. Cl.
*H01R 12/52* (2011.01)
*H01R 13/533* (2006.01)

(52) U.S. Cl.
CPC ......... *H01R 12/523* (2013.01); *H01R 13/533* (2013.01)

(58) Field of Classification Search
CPC H01R 12/523; H01R 13/533; H01R 13/6594; H01R 43/0263; H01R 12/57; H01R 13/405; H01R 13/502; H01R 43/0256; H01R 12/724; H01R 24/60
See application file for complete search history.

(56) References Cited

U.S. PATENT DOCUMENTS

| | | | | |
|---|---|---|---|---|
| 5,256,085 | A * | 10/1993 | Tan | H01R 13/6485 439/372 |
| 2006/0223379 | A1* | 10/2006 | Ho | H01R 12/75 439/660 |
| 2013/0089290 | A1* | 4/2013 | Sloey | G02B 6/3817 385/74 |
| 2013/0242475 | A1* | 9/2013 | Sloey | G06F 1/1658 361/679.01 |
| 2017/0093099 | A1* | 3/2017 | Talalayev | H01R 12/7082 |
| 2018/0090884 | A1* | 3/2018 | Jeon | H01R 13/05 |
| 2020/0099174 | A1* | 3/2020 | Andre | H01R 13/6587 |
| 2020/0379188 | A1* | 12/2020 | Harper | H05K 5/0217 |
| 2024/0106137 | A1* | 3/2024 | Jeon | H01R 12/57 |

* cited by examiner

*Primary Examiner* — Abdullah A Riyami
*Assistant Examiner* — Nader J Alhawamdeh
(74) *Attorney, Agent, or Firm* — Kilpatrick Townsend & Stockton LLP

(57) ABSTRACT

Connector receptacles that can provide a robust and reliable connection to a board and have a small form factor. An example can provide connector receptacles that provide a robust and reliable connection to a board by providing contacts having highly planarized solder tails. The solder tails can be supported by extensions of housing portions to provide consistent placement and alignment, as well an amount of shock absorption. The solder tails can include chamfered surfaces to improve soldered connections to pads of a board. The chamfered surfaces can also enable a reduced pitch between solder tails thereby helping to provide a reduced form factor.

18 Claims, 7 Drawing Sheets

CONNECTOR HAVING NARROW SURFACE-MOUNT CONTACT PITCH

BACKGROUND

The number of types of electronic devices that are commercially available has increased tremendously the past few years and the rate of introduction of new devices shows no signs of abating. Devices such as tablet computers, laptop computers, all-in-one computers, desktop computers, cell phones, storage devices, wearable-computing devices, portable media players, portable computing devices, navigation systems, monitors, remotes, adapters, and others, have become ubiquitous.

Some of these electronic devices can receive data and power through cables that are connected to power adapters, host devices, or other power sources. These cables can have a connector insert that can be inserted into a connector receptacle in the electronic device. The connector receptacle can include contacts that can form electrical connections with corresponding contacts in the connector insert. The contacts of the connector receptacle can be soldered to pads or contacts on a board in the electronic device. The pads or contacts can be connected to electronic circuits in the electronic device through traces and vias of the board.

Occasionally, these electronic devices can be dropped. This can be particularly true for device such as remote control devices. That is, remotes can be used as controllers for games and for selecting programming on streaming devices, and the dynamic nature of their use can make them likely to be dropped or inadvertently thrown.

The force of an impact resulting from a remote being dropped or inadvertently thrown can cause disconnections between contacts of a connector receptacle and a board. These disconnections can render a remote inoperable. Accordingly, it can be desirable to provide a robust and reliable connection between the connector receptacle and the board.

The size of an electronic device, such as a remote, can be limited. The internal volume of the remote can be used for a battery and relevant electronic circuits. Accordingly, it can be desirable to leave room for the battery and relevant electronic circuits by providing a connector receptacle having a small form factor.

Thus, what is needed are connector receptacles that can provide a robust and reliable connection to a board and have a small form factor.

SUMMARY

Accordingly, embodiments of the present invention can provide connector receptacles that provide a robust and reliable connection to a board and have a small form factor. An illustrative embodiment of the present invention can provide connector receptacles that provide a robust and reliable connection to a board by providing contacts having highly planarized solder tails. The solder tails can have chamfered surfaces to increase an area of a solder region between a solder tail and a pad on a board. Housing portion extensions can improve coplanarity of the solder tails as well as an amount of shock absorption. A first housing portion can support a first plurality of contacts and a second housing portion can support a second plurality of contacts. Extensions of the first housing portion can be interleaved with extensions of the second housing portion to form interlocking features to increase the robustness of the resulting connections between solder tails of the first plurality of contacts and corresponding pads of the board as well as between solder tails of the second plurality of contacts and corresponding pads of the board.

These and other embodiments of the present invention can provide connector receptacles having a small form factor by providing contacts having a narrow pitch. This narrow pitch can be facilitated by providing chamfered edges for a bottom surface of solder tails of the plurality of contacts. These chamfered edges can help to provide a robust connection to pads on a board when a narrow pitch is used. The chamfered edges can be formed by stamping, machining, forging, or other process. This narrow pitch is further aided by the extensions from the housing portions. Specifically, these extensions can provide mechanical reinforcement of the solder tails thereby helping them maintain coplanarity and a correct relative position, thereby further facilitating the use of a space-saving narrow pitch.

More specifically, these and other embodiments of the present invention can include features for connector receptacles to provide a robust and reliable connection to a board. For example, contacts of a connector receptacle can include a mating or bottom surface to be soldered to pads of a board, where the bottom surface has one or more chamfered or partially chamfered edges. By way of comparison, traditional flat surfaced solder tails can have regions of stress accumulation when misaligned with the pads. These stress regions can break when an electronic device housing the connector receptacle is dropped or inadvertently thrown. The additional surface area provided by the chamfered edges can help to reduce or eliminate these stress regions.

Additionally, contacts of a connector receptacle can be supported by one or more housing portions. These housing portions can include extensions that extend around and along a portion of solder tails. These extensions can be at least partially around each solder tail and can extend along a front side of the solder tail to an angled or lateral portion of the solder tail for mechanical support. This mechanical support can help to laterally align, or improve the lateral positions, and help to vertically align, or improve the coplanarity, of the solder tails. Extensions from different housing portions can be interleaved to form interlocking features. In these ways, the extensions can help to ensure a robust and reliable connection between the connector receptacle and pads of a board.

A rigid shield can further improve the robustness and reliability of a connector receptacle. This shield can be relatively thick to improve the mechanical reliability of the connector receptacle. The shield can further include flanges and tabs to provide secure mechanical connections to an enclosure and board of an electronic device to further enhance reliability and robustness. The shield can include flanges having openings to accept fasteners that can attach the connector receptacle to an enclosure of the electronic device. The shield can further have through-hole tabs that fit in openings in the board and are soldered to traces or planes, such as a ground plane, in the board. The shield can additionally have surface-mount tabs that can be soldered to the board or other structure in the electronic device.

Also, these and other embodiments of the present invention can provide connector receptacles having a small form factor by providing features that enable a narrow pitch between contact solder tails. For example, contacts of a connector receptacle can include a mating or bottom surface to be soldered to pads of a board, where the bottom surface has one or more chamfered or partially chamfered edges. The additional surface area provided by the chamfered edges can help to ensure a good solder connection between the narrow pitch solder tails and pads on the board even in the event of a specific amount of misalignment between the two. By way of comparison, traditional flat surfaced contacts would form a poor solder connection in the event of the same specific amount of misalignment. This improved tolerance to misalignment can help to enable the use of the narrow pitch solder tails, thus providing a connector receptacle having a small form factor.

Contacts of a connector receptacle can be supported by one or more housing portions that can include extensions that extend around and along a portion of solder tails. These extensions can be at least partially around each solder tail and can extend along a front of the solder tail to an angled or lateral portion of the solder tail for mechanical support. This mechanical support can help to laterally align, or improve the lateral positions help to vertically align, or improve the coplanarity, of the solder tails. This improved positioning can help to reduce the variance in lateral and vertical positions of the solder tails, thereby enable the use of the narrow pitch solder tails and providing a connector receptacle having a small form factor.

Embodiments of the present invention can provide connector receptacles and connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

In these and other embodiments of the present invention, contacts, shields, and other conductive portions of a connector receptacle or connector insert can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel silicon alloys, or other material or combination of materials. They can be plated or coated with nickel, gold, or other material.

The nonconductive portions, such as housings, housing portions, extensions, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles and connector inserts that can be located in or connect to various types of devices, such as tablet computers, laptop computers, desktop computers, all-in-one computers, cell phones, storage devices, wearable-computing devices, portable computing devices, portable media players, navigation systems, monitors, remotes, adapters, and other devices.

While embodiments of the present invention are well-suited to use in connector receptacles, these and other embodiments of the present invention can be utilized in connector inserts and other types of connectors as well.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
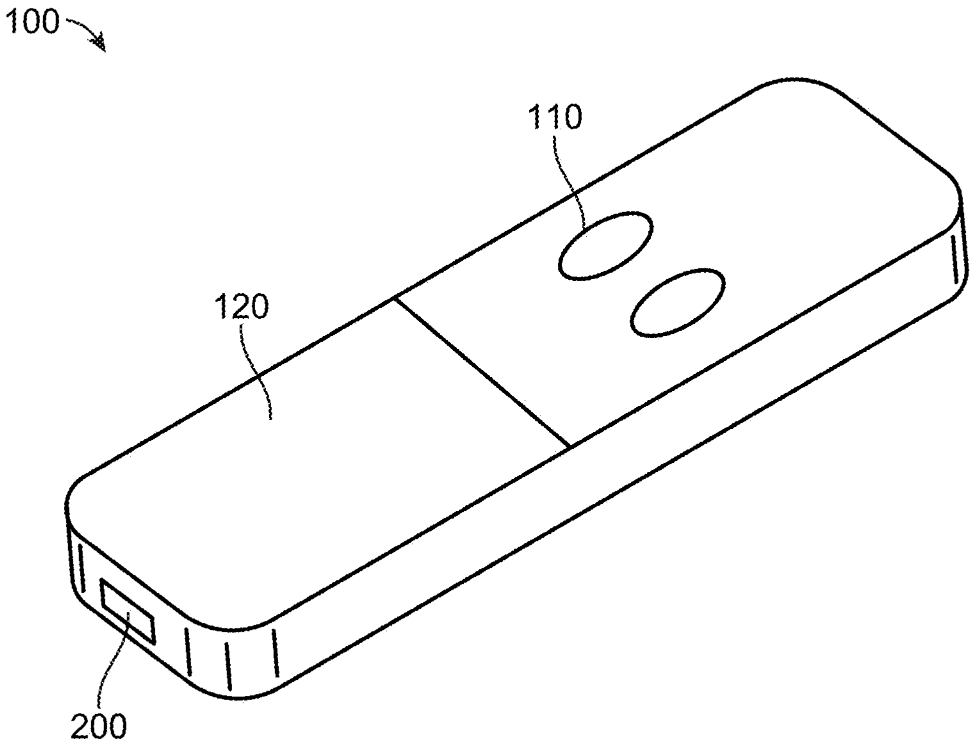
FIG. 1 illustrates an electronic device that can be improved by the incorporation of an embodiment of the present invention.

FIG. 1 illustrates an electronic device that can be improved by the incorporation of an embodiment of the present invention. This figure, as with the other included figures, is shown for illustrative purposes and does not limit either the possible embodiments of the present invention or the claims.

FIG. 1 illustrates electronic device 100 having connector receptacle 200 that can be a connector receptacle according to an embodiment of the present invention. In this example, electronic device 100 can be an accessory device that can function in an adjunct manner with another electronic device (not shown.) In these and other embodiments of the present invention, electronic device 100 can be a standalone or other device. Electronic device 100 is shown for illustrative purposes as a remote control device, or more simply a remote, though electronic device 100 could be another electronic device, such as a tablet computer, laptop computer, desktop computer, all-in-one computer, cell phone, storage device, wearable-computing device, portable computing device, portable media player, navigation system, monitor, adapter, or other device. Electronic device 100 can include controls such as buttons 110 and touchpad 120. Electronic device 100 can be substantially housed in enclosure 130.

Electronic device 100 can include a battery (not shown) that can be charged through connector receptacle 200. Electronic device 100 can include other electronics, such as memories, processors, battery controllers, and other circuits (not shown.) These circuits can be located on one or more boards 300 (shown in FIG. 2) in electronic device 100. Code, such as firmware, software, or both, can run on these circuits. Configuration data for these circuits and code for the firmware and software can also be received through connector receptacle 200, which can be connected to board 300 in electronic device 100. Similarly, data can be provided from circuitry and code in electronic device 100 to an external device using connector receptacle 200.

Electronic devices, such as electronic device 100, can on occasion be inadvertently dropped or thrown. Remotes, such as electronic device 100 shown here, can be used as a controller for gaming and for selecting programming on a streaming device. As a result of the dynamic nature of their use, electronic device 100 can be subject to shock that can damage internal components and connections. Accordingly, it can be desirable to provide a connector receptacle 200 that can form a robust and reliable connection to board 300 in electronic device 100. Electronic device 100 can also have a limited size, and it can be desirable to maximize internal volume inside electronic device 100 for the battery. Accordingly, it can be desirable to provide a connector receptacle 200 having a small form factor. An example of such a connector receptacle is shown in the following figure.

Figure 2:
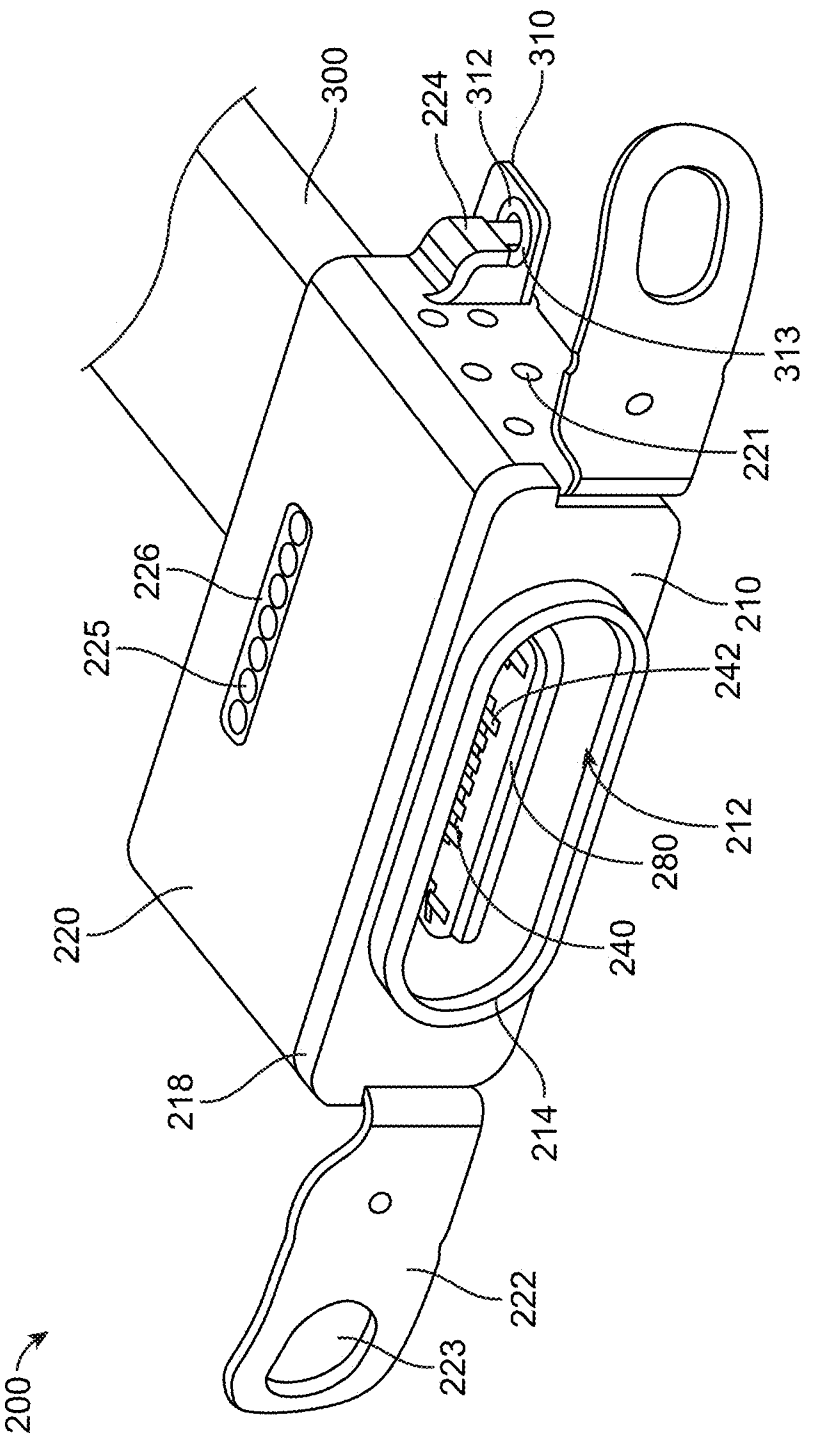
FIG. 2 illustrates a connector receptacle according to an embodiment of the present invention.

FIG. 2 illustrates a connector receptacle according to an embodiment of the present invention. Connector receptacle 200 can be attached to board 300. Connector receptacle 200 can include housing 210 having a passage forming front opening 212 to provide access to contacts 240 on tongue 280. Connector receptacle can be shielded by top shield 220, which can be spot or laser welded to bottom shield 230 (shown in FIG. 6B) at locations 221. Top shield 220 can be spot or laser welded to ground contact 294 (shown in FIG. 6B) at locations 225 in recess 226.

Connector receptacle 200 can form a robust and reliable connection to board 300. To facilitate this, connector receptacle 200 can be securely attached to enclosure 130 of electronic device 100. Accordingly, top shield 220 can include flanges 222. Flanges 222 can include openings 223 for accepting fasteners (not shown) to attach flanges 222 to enclosure 130 of electronic device 100. This arrangement can prevent movement of connector receptacle 200 away from enclosure 130 during a drop or other impact event. Housing 210 of connector receptacle 200 can include lip or raised portion 214. Raised portion 214 can align with an opening or other feature (not shown) in enclosure 130, thereby reducing any lateral shift during a drop. Housing 210 can also include raised portion 218. Raised portion 218 can fit between top shield 220 and enclosure 130, and between bottom shield 230 and enclosure 130. This can help to reduce movement of tongue 280, top housing portion 250, and bottom housing portion 270 (both shown in FIG. 6B) relative to top shield 220, which can be secured in position relative to enclosure 130 and bottom shield 230. Top shield 220 can further include through-hole tabs 224. Tabs 224 can fit in openings 313 in board 300. Tabs 224 can be soldered to metallized region 312 on tab portion 310 of board 300. Metallized region 312 can be connected to traces or planes (not shown) of board 300. For example, metallized region 312 can be electrically connected to a ground plane (not shown) in board 300.

Contacting portions 242 of contacts 240 can be located on a top surface of tongue 280, as shown. Contacting portions 262 of contacts 260 (both shown in FIG. 6B) can be located on a bottom surface of tongue 280. Contacting portions 242 and contacting portions 262 can physically and electrically connect to corresponding contacts on a corresponding connector insert (not shown) when the corresponding connector insert is inserted into front opening 212 of connector receptacle 200.

Figure 3:
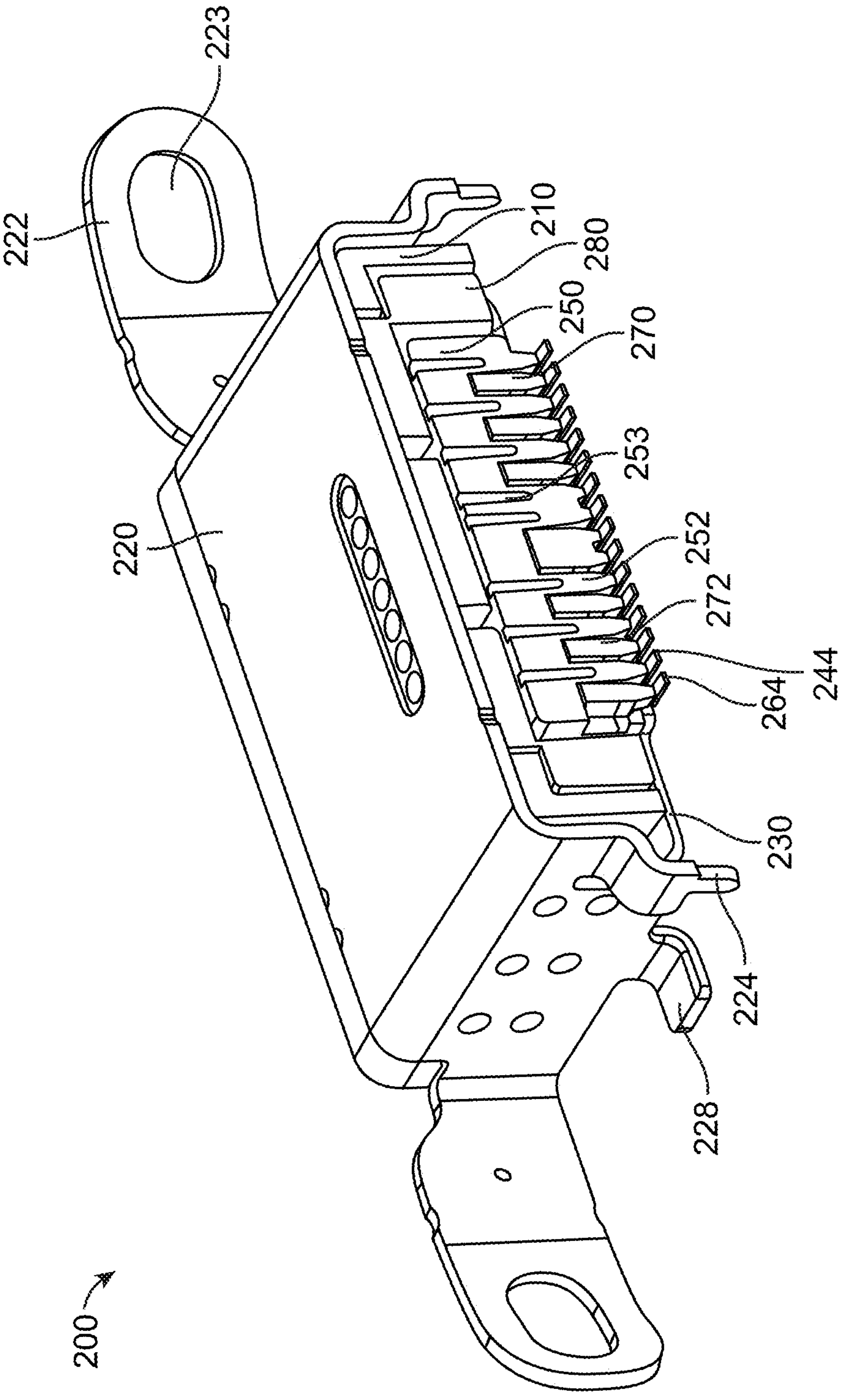
FIG. 3 illustrates a rearview of the connector receptacle of FIG. 2.

FIG. 3 illustrates a rearview of the connector receptacle of FIG. 2. Connector receptacle 200 can include housing 210 shielded by top shield 220 and bottom shield 230. Top shield 220 can include tabs 224 and tabs 228. Top shield 220 can further include flanges 222 having openings 223 to accept fasteners (not shown) to secure connector receptacle 200 to enclosure 130 of electronic device 100 (shown in FIG. 1.) Housing 210 can support tongue 280, first or top housing portion 250, and second or bottom housing portion 270.

Top housing portion 250 can support contacts 240 (shown in FIG. 6B) on a top side of tongue 280, while bottom housing portion 270 can support contacts 260 (shown in FIG. 6B) on a bottom side of tongue 280. Top housing portion 250 can be insert molded and can include extensions 252 that can support solder tails 244 of contacts 240. Similarly, bottom housing portion 270 can be insert molded and can include extensions 272 that can provide support for solder tails 264 of contacts 260. Extensions 252 and extensions 272 can be interleaved to provide interlocking features to secure top housing portion and bottom housing portion in position relative to each other. Top housing portion 250 can further include slots 253. Slots 253 can provide an amount of compliance to top housing portion 250. This can help to relieve stress that can result when extensions 252 and extensions 272 are fit together during assembly.

Figure 4:
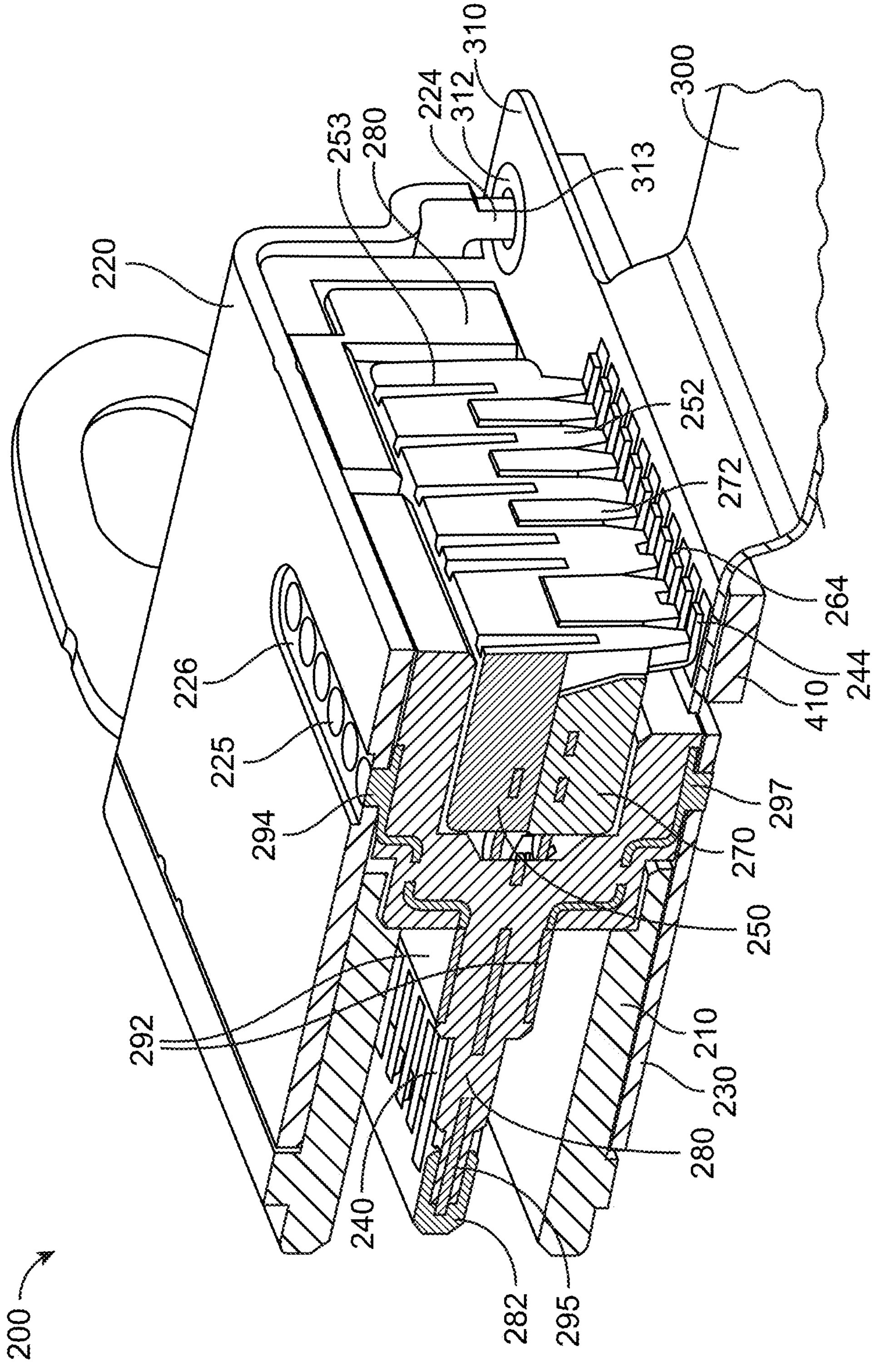
FIG. 4 illustrates a cutaway side view of the connector receptacle of FIG. 2.

FIG. 4 illustrates a cutaway side view of the connector receptacle of FIG. 2. Connector receptacle 200 can include top shield 220. Top shield 220 can include tab 224. Tab 224 can fit in opening 313 of tab portion 310 of board 300. Tab 224 can be soldered to metallized region 312. Metallized region 312 can be connected to traces or planes (not shown) in board 300. For example, metallized region 312 can be connected to a ground plane (not shown) in board 300. Tab 224 can further be located in an opening (not shown) in enclosure portion 410. Tab 224 can be soldered or otherwise fixed in place relative to enclosure portion 410. Enclosure portion 410 can be a portion of enclosure 130 of electronic device 100 (both shown in FIG. 1.) Enclosure portion 410 can be attached to a portion of enclosure 130 of electronic device 100. Top shield 220 can be spot or laser welded to ground contacts 294 of ground frame 290 (shown in FIG. 6A) at locations 225 in recess 226. Bottom shield 230 can be spot or laser welded to ground contact 297 of ground frame 290.

Housing 210 can support tongue 280, top housing portion 250, and bottom housing portion 270. A top side of tongue 280 and top housing portion 250 can support contacts 240, while a bottom side of tongue 280 and bottom housing portion 270 can support contacts 260 (shown in FIG. 6B.) Leading edges of tongue 280, as well as leading edges of contacts 240 and contacts 260, can be over molded by overmolding 282. Tongue 280 can further support top and bottom ground pads 292 on a top and bottom side, and central ground plane 295. Central ground plane 295, top and bottom ground pads 292, ground contact 294, and ground contact 297 can all be part of ground frame 290.

Top housing portion 250 can be formed by insert molding and can include extensions 252. Extensions 252 can be formed around and along portions of solder tails 244 of contacts 240. Bottom housing portion 270 can be formed by insert molding and can include extensions 272. Top housing portion 250 can further include slots 253. Slots 253 can provide an amount of compliance to top housing portion 250. This can help to relieve stress that can result when extensions 252 and extensions 272 are fit together during assembly. Extensions 272 can be formed around and along portions of solder tails 264 of contacts 260. Extensions 252 and extensions 272 can be interleaved to form interlocking features. Extensions 252 and extensions 272 are shown in further detail in the following figure.

Figure 5:
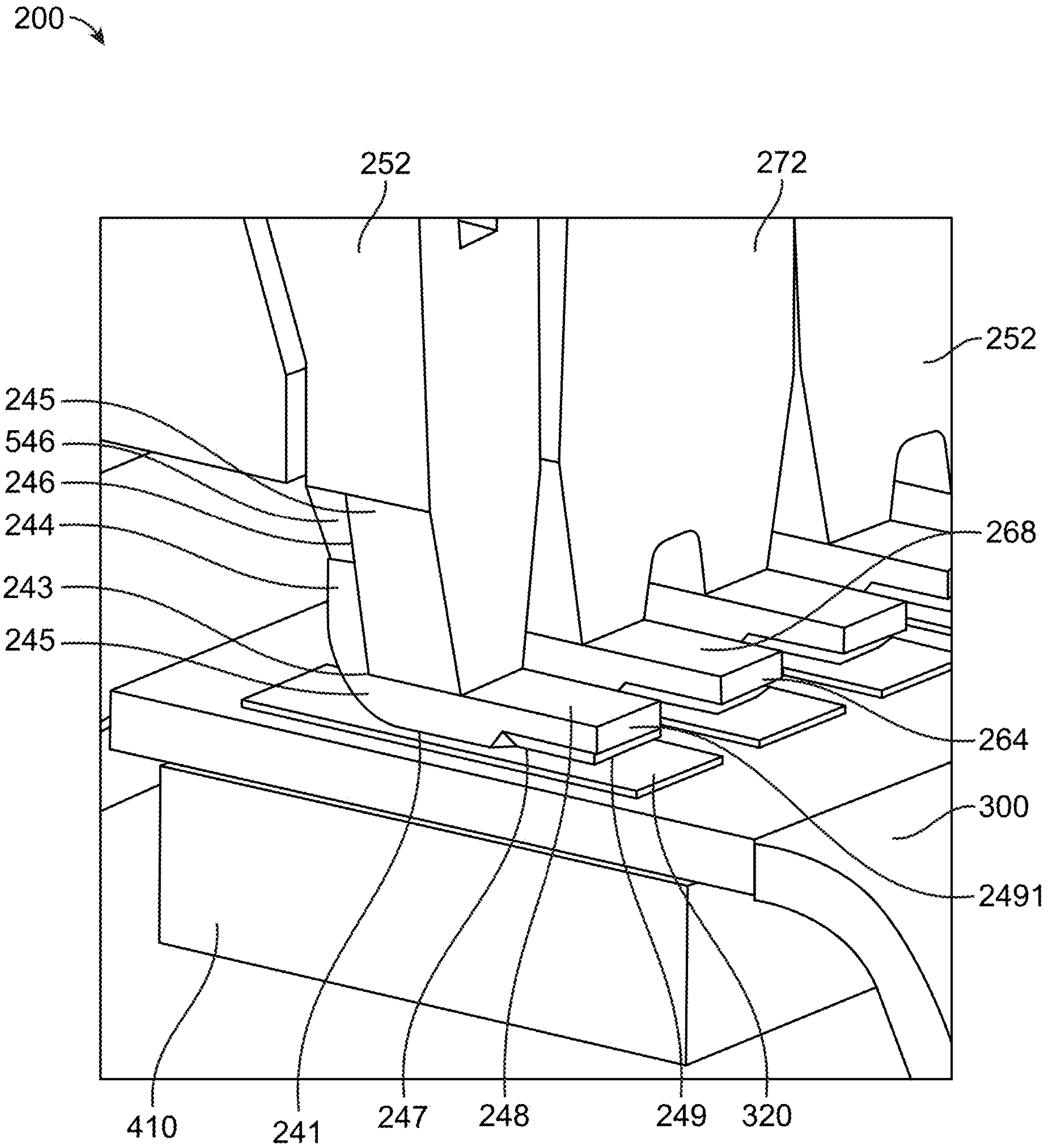
FIG. 5 illustrates a portion of the connector receptacle of FIG. 2.

FIG. 5 illustrates a portion of the connector receptacle of FIG. 2. Solder tails 244 of contacts 240 (shown in FIG. 6B) can be angled or bent at locations 243 to form angled or lateral portion 245. Lateral portion 245 can include bottom surface 241, which can be soldered to pad 320 on board 300. Extensions 252 of top housing portion 250 (shown in FIG. 6B) can be formed at least partially around and along a portion of solder tails 244. Extensions 252 can include portions 254 that can extend along side surfaces 546 and front surface 246 of solder tails 244. Portion 254 of each extension 252 can terminate at top surface 248 of lateral portion 245 of solder tail 244. Lateral portion 245 of solder tails 244 can have a chamfered front edge 249. Lateral portion 245 can further include chamfered side edges 247, where the chamfer can extend along some or all of a length of lateral portion 245. Chamfered front edge 249 and chamfered side edges 247 can be formed by stamping, machining, forging, or other process.

Figure 6B:
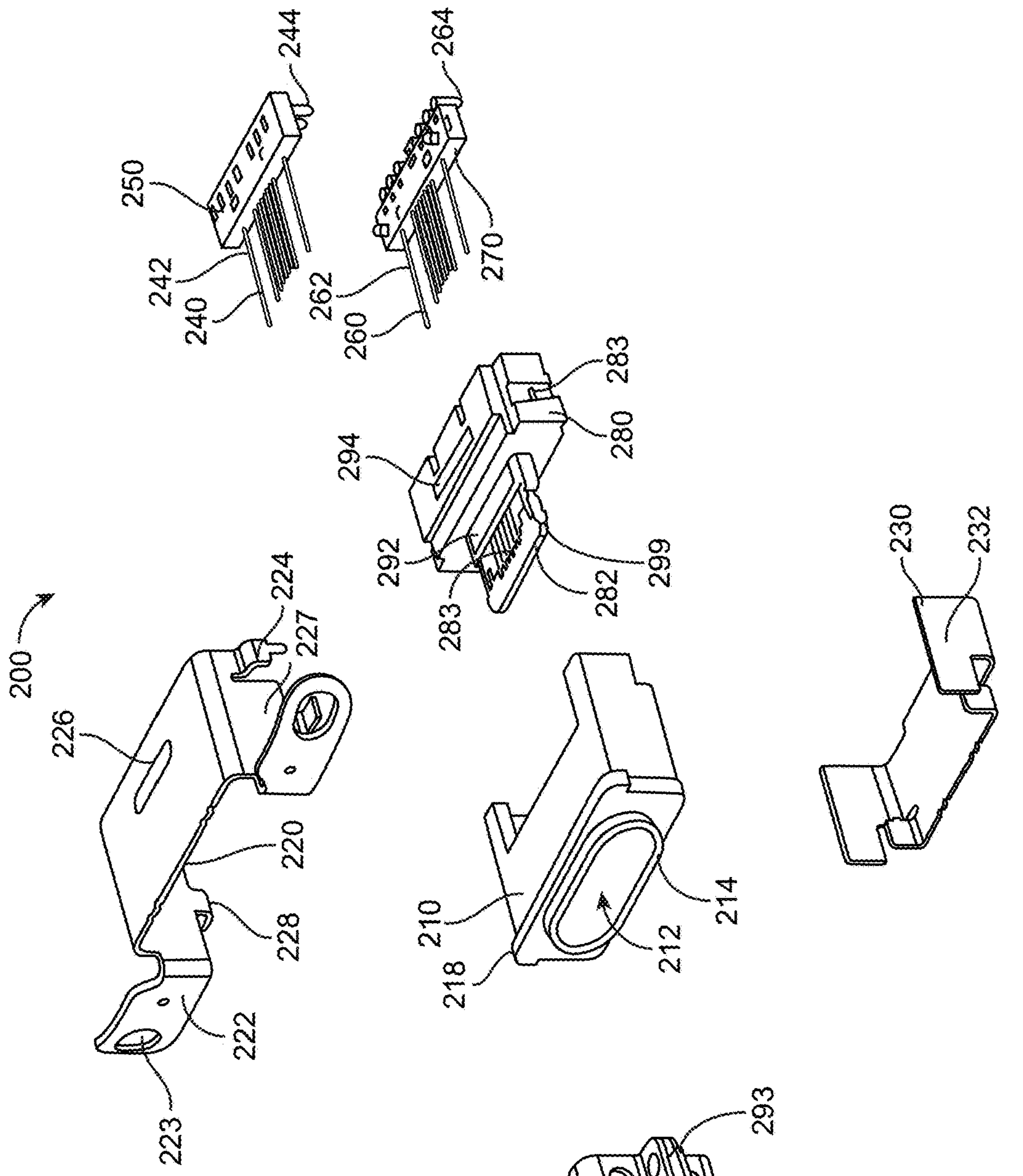
FIG. 6A and FIG. 6B illustrate an exploded view of the connector receptacle of FIG. 2.

In the same or similar manner, extensions 272 of bottom housing portion 270 (shown in FIG. 6B) can extend to a top surface 268 of solder tails 264 of contacts 260 (shown in FIG. 6B.) Extensions 272 can be formed at least partially around and along portions of solder tails 264 in a manner that is the same or similar to extensions 252 and solder tails 244. Edges of solder tails 264 can be chamfered in a same or similar manner as solder tails 244. Extensions 252 and extensions 272 can be interleaved to form interlocking features. Board 300 can be attached to enclosure portion 410 for mechanical support.

Solder tails 244 and solder tails 264 can include front edges 2491. Front edges 2491 are typically where contacts 240 and contacts 260 (both shown in FIG. 6B) are cut away from a carrier (not shown) during assembly. As such, they are typically not plated surfaces. By providing chamfered front edge 249 a portion of the front edge of solder tails 244 and solder tails 264 can be plated.

Again, electronic device 100 can be inadvertently dropped or thrown. To prevent damage during such an event, embodiments of the present invention can provide connector receptacles 200 that form a robust and reliable connection to board 300. For example, contacts 240 and contacts 260 of connector receptacle 200 can include bottom surface 241 to be soldered to pads 320 of board 300, where each bottom surface 241 has one or more chamfered or partially chamfered edges, specifically front edge 249 and side edges 247. By way of comparison, traditional flat surfaced solder tails can have regions of stress accumulation when misaligned with pads. These stress regions can break when an electronic device housing the connector receptacle is dropped or inadvertently thrown. The additional area of the chamfered bottom surface 241 can help to reduce or eliminate these stress regions.

Additionally, contacts 240 and contacts 260 can be supported by top housing portion 250 and bottom housing portion 270. Top housing portion 250 can include extensions 252 and bottom housing portion 270 can include extensions 272 that extend at least partially around and along a portion of solder tails 244 and 264, respectively. Extensions 252 and extensions 272 can be at least partially around and along each solder tail 244 and solder tail 264 (respectively) and can extend to top surface 248 of lateral portion 245 for mechanical support. This mechanical support can help to laterally align, or improve the lateral positions, and help to vertically align, or improve the coplanarity, of solder tails 244 and solder tails 264. Extensions 252 and extensions 272 can be interleaved to form interlocking features. In these ways, extensions 252 and extensions 272 can help to ensure a robust and reliable connection between connector receptacle 200 and pads 320 on board 300.

Top shield 220 (shown in FIG. 6B) can further improve the robustness and reliability of connector receptacle 200. Top shield 220 can be relatively thick to improve the mechanical reliability of connector receptacle 200. Top shield 220 can further include flanges 222, tabs 224, and tabs 228 (all shown in FIG. 3) to provide secure mechanical connections to enclosure 130 (shown in FIG. 1) and board 300 (shown in FIG. 2) of electronic device 100 (shown in FIG. 1) to further enhance reliability and robustness. Top shield 220 can include flanges 222 having openings 223 (both shown in FIG. 3) to accept fasteners (not shown) that can attach connector receptacle 200 to enclosure 130 of electronic device 100. Top shield 220 can further have through-hole tabs 224 that fit in openings 313 (shown in FIG. 3) in board 300 and are soldered to traces or planes, such as a ground plane (not shown), in board 300, or enclosure portion 410 (shown in FIG. 4.) Top shield 220 can additionally have surface-mount tabs 228 (shown in FIG. 3) that can be soldered to board 300 or other structure in electronic device 100.

Also, these and other embodiments of the present invention can include features for connector receptacle 200 to have a small form factor. This can be enabled by providing features for connector receptacle 200 that enable a narrow pitch between contact solder tails 244 and solder tails 264. For example, contacts of a connector receptacle can include bottom surface 241 to be soldered to pads 320 of board 300, where bottom surface 241 has a chamfered front edge 249 and side edges 247, which can be all or partially chamfered. The additional area provided by this chamfering to bottom surface 241 can help to ensure a good solder connection between the narrow pitch solder tails 244 and solder tails 264 and pads 320 on board 300 even in the event of a specific amount of misalignment between the two. By way of comparison, traditional flat surfaced contacts would form a poor solder connection in the event of the same specific amount of misalignment. This improved tolerance to misalignment can help to enable the use of the narrow pitch solder tails 244 and solder tails 264, thus enabling connector receptacle 200 to have a small form factor.

Contacts 240 and contacts 260 of connector receptacle 200 can be supported by top housing portion 250 and bottom housing portion 270, respectively. Top housing portion 250 can include extensions 252 that extend at least partially around and along a portion of solder tails 244. Bottom housing portion 270 can include extensions 272 that extend around and along a portion of solder tails 264. Extensions 252 and extensions 272 can be at least partially around each solder tail 244 and solder tail 264 (respectively) and can extend to top surface 248 of lateral portion 245 of solder tails 244 and solder tails 264 (respectively) for mechanical support. This mechanical support can help to laterally align, or improve the lateral positions, and help to vertically align, or improve the coplanarity, of solder tails 244 and solder tails 264. This improved positioning can help to reduce the variance in lateral and vertical positions of solder tails 244 and solder tails 264, thereby enabling the use of the narrow pitch solder tails 244 and solder tails 264 and enabling connector receptacle 200 to have a small form factor.

In these and other embodiments of the present invention, each extension 252 and each extension 272 can help to support one or more than one solder tail 244 or solder tail 264, respectively.

Figure 6A:
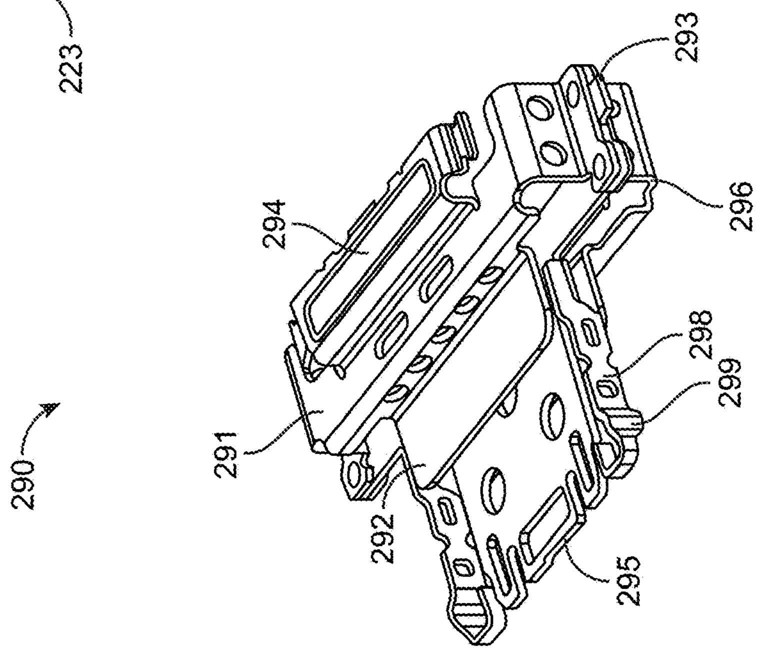

FIG. 6A and FIG. 6B illustrate an exploded view of the connector receptacle of FIG. 2. FIG. 6A shows a ground frame that can be used by connector receptacle 200. Ground frame 290 can include top metal portion 291, central ground plane 295, and bottom metal portion 296. Top metal portion 291 can include ground contact 294 that can electrically connect to top shield 220, as well as top ground pad 292. Bottom metal portion 296 can include ground contact 297 and bottom ground pad 292 (both shown in FIG. 4.) Bottom metal portion 296 can further include side ground contacts 298 having side ground contacts 299. Ground frame 290 can further include side ground tabs 293.

FIG. 6B can include housing 210 having a passage forming front opening 212. Housing 210 can further include raised portions 214 and raised portion 218. Raised portion 214 can fit in an opening or other corresponding feature (not shown) in enclosure 130 of electronic device 100 (both shown in FIG. 1.) This can help to limit lateral, that is, side to side or up-and-down, movement of connector receptacle 200 relative to enclosure 130. Raised portion 218 can fit between top shield 220 and enclosure 130, and between bottom shield 230 and enclosure 130. This can help to reduce movement of tongue 280, top housing portion 250, and bottom housing portion 270, relative to top shield 220, which can be attached to enclosure 130 and bottom shield 230.

Top shield 220 can include flanges 222 having openings 223 for accepting a fastener (not shown) to secure connector receptacle 200 to enclosure 130 of electronic device 100. Bottom shield 230 can include side tabs 232 which can be spot or laser welded to side tabs 227 of top shield 220. Top shield 220 can further include recess 226, tabs 224, and tabs 228.

Tongue 280 can support ground contact 294, ground contact 297 (shown in FIG. 4), top and bottom ground pads 292, slots 283, overmold 282, and side ground tabs 293. Slots 283 can accept contacts 240. Tongue can further support overmolding 282 and side ground contact 299, that can physically and electrically connect to an inside surface (not shown) of a corresponding connector insert (not shown) when the corresponding connector insert is inserted into front opening 212 of connector receptacle 200.

Contacts 240 can include contacting portions 242 and solder tails 244. Contacts 240 can be supported by top housing portion 250. Contacts 260 can include contacting portions 262, which can be located in slots (not shown) on a bottom side of tongue 280, and solder tails 264. Contacts 260 can be supported by bottom housing portion 270. Contacting portions 242 and contacting portions 262 can physically and electrically connect to corresponding contacts on a corresponding connector insert when the corresponding connector insert is inserted into front opening 212 of connector receptacle 200.

Figure 7B:
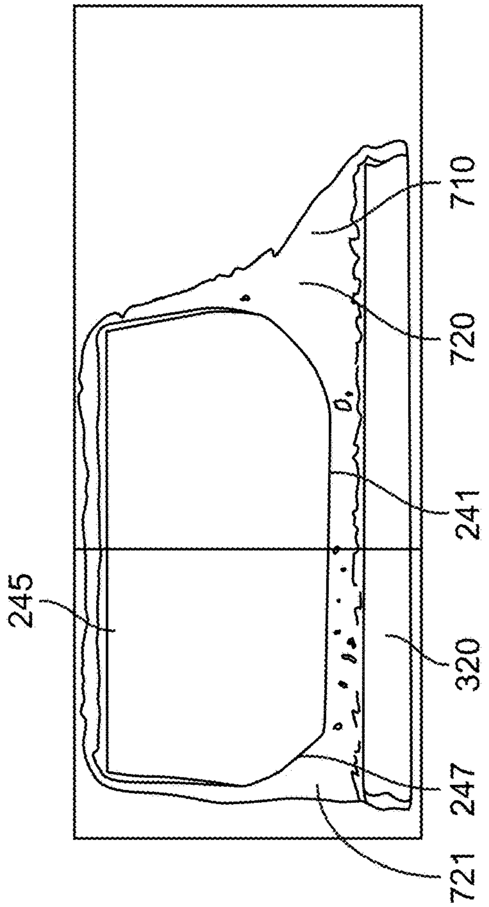
FIG. 7A and FIG. 7B illustrate solder connections between solder tails and a pad on a board under various alignment conditions.
Figure 7A:
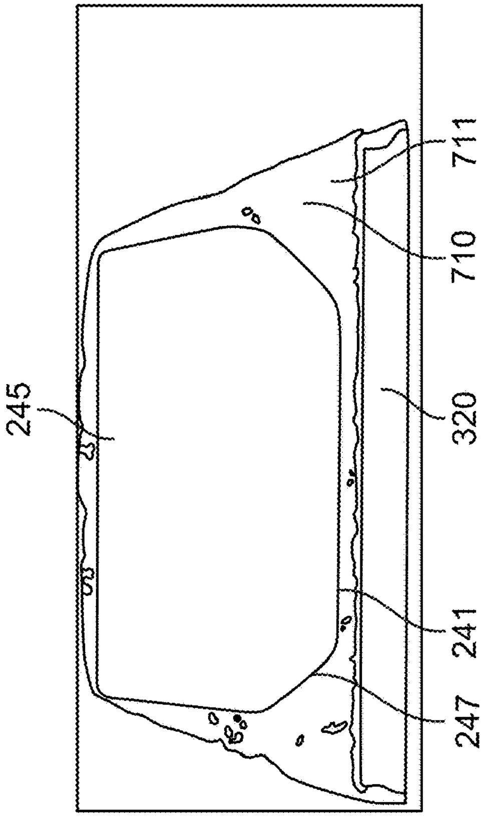

FIG. 7A and FIG. 7B illustrate solder connections between a solder tail and a pad on a board under various alignment conditions. In FIG. 7, a lateral portion 245 of solder tail 244 (shown in FIG. 5) can be physically and electrically connected by solder 710 to pad 320. Chamfered side edges 247 can increase an effective width of bottom surface 241. Chamfered side edges 247 can allow solder 710 to accumulate in thicker regions 711, thereby improving the robustness and reliability of a connection between solder tail 244 and pad 320. In FIG. 7A, lateral portion 245 of solder tail 244 is shown as being well aligned to pad 320.

In FIG. 7B, lateral portion 245 of solder tail 244 (shown in FIG. 5) can be misaligned a specific amount relative to pad 320. Chamfered side edges 247 can still allow the accumulation of solder 710 in thicker solder regions 720. Also, chamfered side edges 247 can allow an accumulation of solder 710 in solder region 721. Solder region 720 and solder region 721 can be sufficient to provide a reliable solder connection between bottom surface 241 of lateral portion 245 of solder tail 244 and pad 320, despite the misalignment. As can be seen, where bottom surface 241 to be flat, solder region 721 would not exist and the solder connection between bottom surface 241 of lateral portion 245 of solder tail 244 and pad 320 would be less robust and reliable.

Embodiments of the present invention can provide connector receptacles and connector inserts that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

In these and other embodiments of the present invention, contacts, shields, and other conductive portions of a connector receptacle or connector insert can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel silicon alloys, or other material or combination of materials. They can be plated or coated with nickel, gold, or other material.

The nonconductive portions, such as housings, housing portions, extensions, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide connector receptacles and connector inserts that can be located in or connect to various types of devices, such as tablet computers, laptop computers, desktop computers, all-in-one computers, cell phones, storage devices, wearable-computing devices, portable computing devices, portable media players, navigation systems, monitors, remotes, adapters, and other devices.

While embodiments of the present invention are well-suited to use in connector receptacles, these and other embodiments of the present invention can be utilized in connector inserts and other types of connectors as well.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:
- a front housing having a passage, the passage forming a front opening;
- a tongue located in the passage;
- a first plurality of contacts, each having a contacting surface supported by the tongue and each having a solder tail, wherein the solder tail includes a bottom surface to be soldered to a board, wherein the bottom surface includes a chamfered edge; and
- a first housing portion around a portion of each of the first plurality of contacts, wherein for each of the first plurality of contacts, the first housing portion includes an extension along a front surface of the solder tail.

2. The connector receptacle of claim 1 wherein for each of the first plurality of contacts, the bottom surface has a chamfered front edge and side edges, where each side edge is at least partially chamfered.

3. The connector receptacle of claim 2 wherein for each of the first plurality of contacts, the solder tail includes an angled lateral portion.

4. The connector receptacle of claim 3 wherein for each of the first plurality of contacts, the extension extends to a top surface of the lateral portion of the solder tail.

5. The connector receptacle of claim 4 further comprising a second plurality of contacts, each having a contacting surface supported by the tongue and each having a solder tail, wherein the solder tail includes a bottom surface to be soldered to a board, wherein the bottom surface includes a chamfered edge.

6. The connector receptacle of claim 5 further comprising a second housing portion around a portion of each of the second plurality of contacts, wherein for each of the second plurality of contacts, the second housing portion includes an extension along a front surface of the solder tail.

7. The connector receptacle of claim 6 wherein the extensions of the first housing portion and the extensions of the second housing portion interlock with each other.

8. A connector receptacle comprising:
- a first plurality of contacts, each of the first plurality of contacts including a solder tail, the solder tail bent to have a lateral portion, the lateral portion having a top surface;
- a first housing portion supporting the first plurality of contacts, the first housing portion including a first plurality of extensions, each of the first plurality of extensions extending to the top surface of the lateral portion of one or more of the solder tails of the first plurality of contacts;
- a second plurality of contacts, each of the second plurality of contacts including a solder tail, the solder tail bent to have a lateral portion, the lateral portion having a top surface; and
- a second housing portion supporting the second plurality of contacts, the second housing portion including a second plurality of extensions, each of the second plurality of extensions extending to the top surface of the lateral portion of one or more of the solder tails of the second plurality of contacts,
- wherein the first plurality of extensions and the second plurality of extensions are interleaved.

9. The connector receptacle of claim 8 wherein the first plurality of extensions and the second plurality of extensions are interleaved to form interlocking features.

10. The connector receptacle of claim 9 wherein the lateral portion of each of the first plurality of contacts and the second plurality of contacts include a bottom surface opposite the top surface, wherein an edge of the bottom surface is chamfered.

11. The connector receptacle of claim 10 wherein for the lateral portion of each of the first plurality of contacts and the lateral portion of each of the second plurality of contacts, the bottom surface has a chamfered front edge and side edges, where each side edge is at least partially chamfered.

12. The connector receptacle of claim 11 further comprising a tongue, a top of the tongue supporting contacting portions of the first plurality of contacts and a bottom of the tongue supporting contacting portions of the second plurality of contacts.

13. The connector receptacle of claim 12 further comprising a shield around portions of the connector receptacle, wherein the shield comprises flanges extending away from the first housing portion and the flanges each having an opening for a fastener.

14. An electronic device comprising a connector receptacle, the electronic device further comprising:
- an enclosure having an opening providing access to the connector receptacle;
- a board comprising a plurality of pads; and
- the connector receptacle, the connector receptacle comprising:
  - a first plurality of contacts, each of the first plurality of contacts including a solder tail, the solder tail bent to have a lateral portion, the lateral portion having a top surface and a bottom surface, the bottom surface having a chamfered edge and soldered to a corresponding pad on the board;
  - a first housing portion supporting the first plurality of contacts, wherein the first housing portion includes a first plurality of extensions, each of the first plurality of extensions extending to the top surface of the lateral portion of one or more of the solder tails of the first plurality of contacts;
  - a second plurality of contacts, each of the second plurality of contacts including a solder tail, the solder tail bent to have a lateral portion, the lateral portion having a top surface and a bottom surface, the bottom surface having a chamfered edge and soldered to a corresponding pad on the board; and
  - a second housing portion supporting the second plurality of contacts, wherein the second housing portion includes a second plurality of extensions, each of the second plurality of extensions extending to the top surface of the lateral portion of one or more of the solder tails of the second plurality of contacts.

15. The electronic device of claim 14 wherein for the lateral portions of each of the first plurality of contacts and for the lateral portions of each of the second plurality of contacts, the bottom surface has a chamfered front edge and side edges, where each side edge is at least partially chamfered.

16. The electronic device of claim 15 wherein the first plurality of extensions and the second plurality of extensions are interleaved.

17. The electronic device of claim 16 further comprising a shield around portions of the connector receptacle, wherein the shield comprises flanges extending away from the first housing portion and the flanges each having an opening for a fastener to secure the connector receptacle to the enclosure.

18. The electronic device of claim 17 wherein the shield further comprises through-hole tabs, the through-hole tabs positioned in openings in the board and soldered to a ground plane in the board.

* * * * *